Aug. 24, 1937. C. GIRL 2,091,069
DECK LOADER AND UNLOADER
Filed April 10, 1936 2 Sheets-Sheet 1
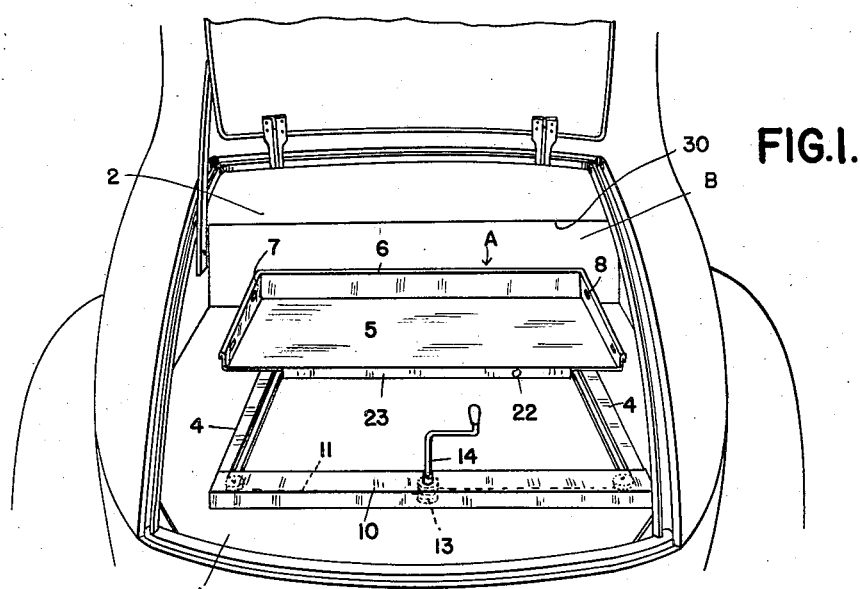
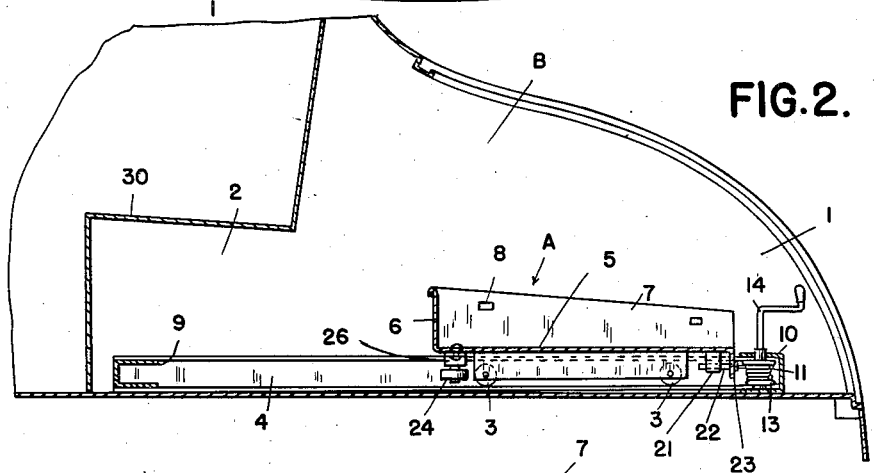
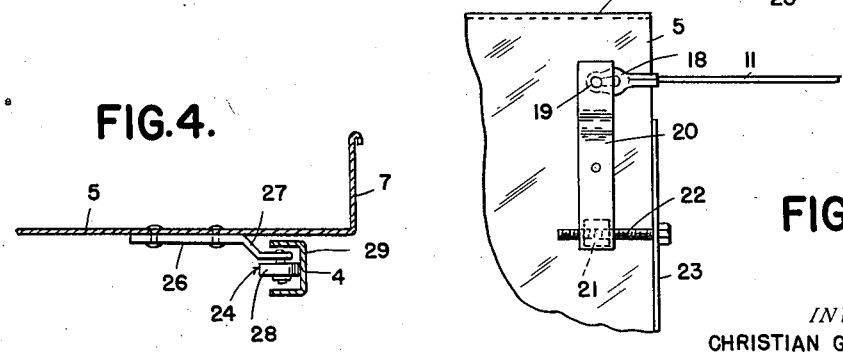
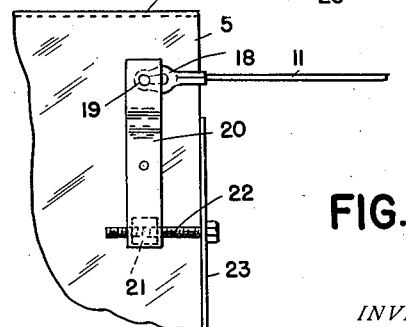
INVENTOR
CHRISTIAN GIRL
BY Whittemore Hulbert
Whittemore & Belknap
ATTORNEYS Aug. 24, 1937.     C. GIRL     2,091,069

DECK LOADER AND UNLOADER

Filed April 10, 1936     2 Sheets-Sheet 2

INVENTOR
CHRISTIAN GIRL
BY *Whittemore Hulbert*
*Whittemore Belknap*
ATTORNEYS

Patented Aug. 24, 1937

2,091,069

UNITED STATES PATENT OFFICE 2,091,069

DECK LOADER AND UNLOADER

Christian Girl, Detroit, Mich., assignor to Kelch Heater Company, Detroit, Mich., a corporation of Michigan Application April 10, 1936, Serial No. 73,740

11 Claims. (Cl. 214—65)

This invention relates generally to loading and unloading devices for the rear decks or storage compartments of coupes and constitutes an improvement upon the devices for this purpose set forth in my Patent 2,014,019 dated September 10, 1935.

One of the essential objects of the present invention is to simplify the construction and reduce the over-all cost of manufacturing and installing such devices. In the present instance, this is accomplished by using only one cable and by providing suitable anti-friction side thrust devices for facilitating the fore and aft movement of the carrier by said cable.

In the accompanying drawings:

Figure 1 is a fragmentary perspective view of a coupe showing a loading and unloading device embodying my invention within the rear storage compartment thereof and with the article carrying tray of the device at the inaccessible forward end of the storage compartment;

Figure 2 is a fragmentary longitudinal vertical sectional view through the coupe and showing the article carrying tray at the accessible rear end of the storage compartment;

Figure 4 is a sectional view taken substantially on the line 4—4 of Figure 3;

Figure 5 is a bottom plan view of a portion of the carrier and one of the cable connections, with parts broken away and in section;

Figure 3:
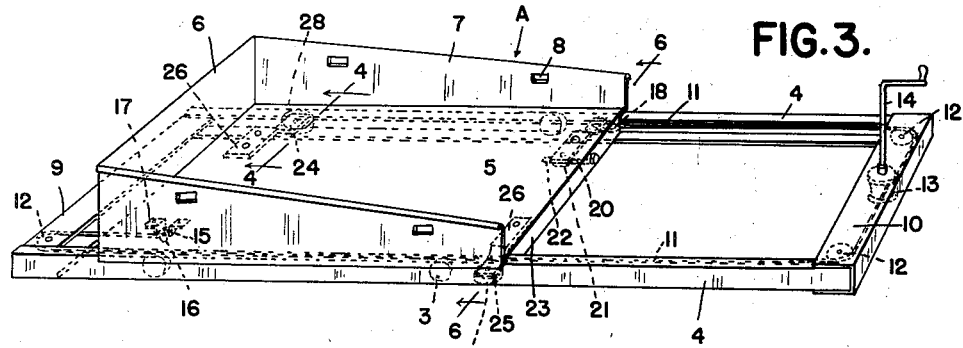
Figure 3 is a perspective view of the loading and unloading device.
Figure 7:
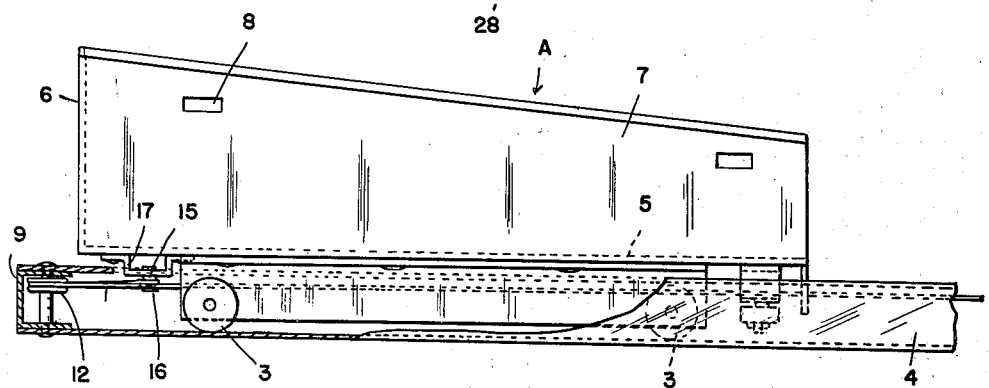
Figure 7 is a fragmentary side elevation, with parts broken away and in section, of the structure shown in Figure 3.
Figure 6:
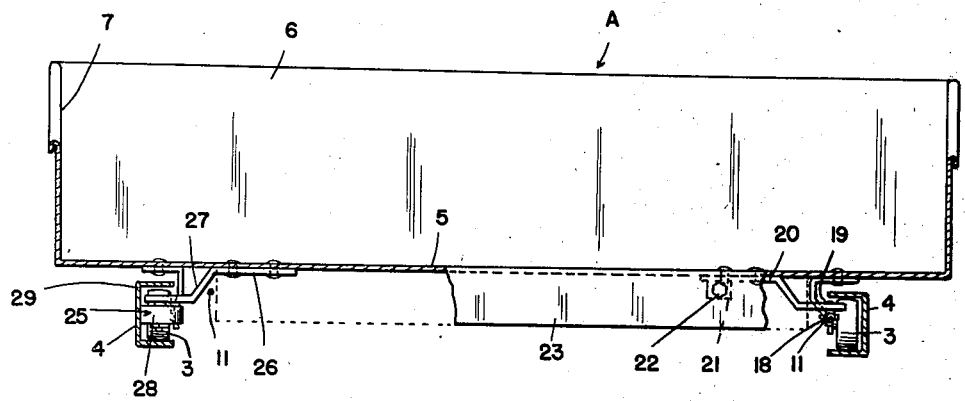
Figure 6 is a sectional view taken substantially on the line 6—6 of Figure 3.

Referring now to the drawings, A is an article carrier within the rear deck or storage compartment B of a coupe. As shown, this carrier A is movable lengthwise of the compartment from an accessible rear end 1 to a relatively inaccessible forward end 2 thereof, and for this purpose is provided at its forward and rear ends with supporting casters or rollers 3 that travel in inwardly opening longitudinally extending channels 4 rigidly mounted within the compartment in substantially parallel relation to the floor thereof.

Preferably the carrier A is in the form of a tray having a substantially flat bottom 5 and upright front and side walls 6 and 7, respectively. Any suitable means such as straps (not shown) may be engaged with openings 8 in the side walls 7 of the tray to hold the articles in or on said tray.

Preferably the channels 4 are connected at their forward and rear ends to cross bars 9 and 10, respectively, which are also of channel configuration. Such cross bars cooperate with the channels 4 to form a substantially rectangular frame.

In the present instance, the carrier A is moved forwardly and rearwardly in the compartment B by a single cable 11 which, as shown, is trained around sheaves 12 at three corners of the frame and around a drum 13 intermediate the rear sheaves. As shown, the forward sheaves 12 are within the rearwardly opening channel of the forward cross bar 9, while the rear sheaves 12 are within the forwardly opening rear cross bar 10. The drum 13 is likewise within the channel of the rear cross bar 10 and is provided with a removable crank 14.

Referring now to the connections between the cable 11 and carrier A, 15 is a tab rigid with one end of the cable and connected to a headed stud 16 projecting from a bracket 17 rigid with the bottom 5 of the carrier adjacent the left forward corner thereof. 18 is another tab rigid with the other end of the cable and connected to a headed stud 19 projecting from a pivoted adjusting bar 20 at the right rear corner of the carrier. Preferably this bar 20 is pivoted substantially midway of its ends to the bottom 5 of the carrier. The stud 19 is at one end of said bar, while a block 21 is carried by the bar at its other end and is threadedly engaged by an adjusting screw 22 carried by a depending flange 23 at the rear edge of the tray or carrier.

To facilitate the fore and aft movement of the tray, I have provided at diagonally disposed corners opposite the left forward and the right rear corners aforesaid of the carrier anti-friction side thrust devices 24 and 25, respectively, for engagement with the channels 4. Preferably each device comprises a bar or strip 26 rigidly secured to the bottom 5 of the tray and having an offset outer end 27 carrying a roller or anti-friction element 28 that is engageable with the vertical web 29 of the adjacent channel 4.

In use, the carrier A may be moved forwardly and rearwardly in the compartment B by the cable 11. The crank 14 may be readily engaged with the drum 13 for this purpose and may be removed while the carrier is being loaded or unloaded. Should the cable 11 need to be tightened or loosened, the desired adjustment thereof may be effected by adjustment of the screw 22.

Thus, from the foregoing, it will be apparent that I have provided a very efficient and practical carrier which may be easily and conveniently loaded or unloaded without climbing upon a rear bumper or other part of the vehicle. In other words, the carrier may be readily manipulated and loaded and unloaded by one person from either side of the coupe while such person is standing on the ground. After the carrier has been loaded in its rearward position, it may be moved forwardly under the seat 30 of the coupe so that the space in the compartment at the rear of the carrier may be loaded. When unloading, the articles are removed first from the space within the compartment at the rear of the carrier and then the carrier is moved rearwardly and unloaded.

What I claim as my invention is:

1. A loading and unloading device for a rear compartment of a coupe, said compartment having an accessible rear end and a relatively inaccessible forward end, comprising an article carrier movable lengthwise of the compartment from substantially one end to the other thereof and provided with supporting rollers, a substantially rectangular frame rigidly mounted within said compartment and substantially parallel with the floor thereof, opposite sides of said frame forming runways for said rollers, and means for moving said article carrier lengthwise of said compartment including five rotatable elements, two at each end of the frame, and one at one end of the frame between the two at that end, and a single flexible cable trained around said rotatable elements, one end of said cable being connected to said article carrier at one end thereof, and the other end of said cable being connected to said article carrier at its other end.

2. A loading and unloading device for a rear compartment of a coupe, said compartment having an accessible rear end and a relatively inaccessible forward end, comprising an article carrier movable lengthwise of the compartment from substantially one end to the other thereof and provided with supporting rollers, runways for said rollers rigidly mounted within said compartment and substantially parallel with the floor thereof, rotatable elements at opposite ends of said runways, means for moving said article carrier lengthwise of said compartment including a drum intermediate said runways, and a single flexible cable trained around said rotatable elements and drum and connected to said article carrier at diagonally opposite corners thereof, and anti-friction side thrust devices connected to said article carrier at diagonally opposite corners thereof opposite the corners just mentioned of said article carrier and engaging said runways to facilitate movement of the article carrier when actuated by the means aforesaid.

3. A loading and unloading device for a rear compartment of a coupe, said compartment having an accessible rear end and a relatively inaccessible forward end, comprising an article carrier movable lengthwise of the compartment from substantially one end to the other thereof and provided with supporting rollers, runways for said rollers rigidly mounted within said compartment and substantially parallel with the floor thereof, rotatable elements at opposite ends of said runways, and means for moving said article carrier lengthwise of said compartment including a drum intermediate said runways, a bracket connected to said article carrier, an adjusting bar pivotally connected to said article carrier, and a single flexible cable trained around said rotatable elements and drum and terminally connected to said bracket and adjusting bar respectively.

4. A loading and unloading device for a rear compartment of a coupe type vehicle, said compartment having a relatively inaccessible forward end, comprising an article carrier movable lengthwise of said compartment from substantially one end to the other thereof and provided with supporting rollers, a substantially rectangular frame mounted within said compartment and substantially parallel with the floor thereof, opposite sides of said frame providing runways for said rollers, sheaves carried by said frame at the corners thereof, and means for moving said article carrier lengthwise of said runways including a drum carried by the frame at the rear end of said compartment, a single flexible cable trained around said sheaves and drum and connected to said article carrier at diagonally opposite corners thereof, and means at corners opposite the corners just mentioned of said article carrier engageable with said runways for maintaining said article carrier on a true course while being moved by the means aforesaid.

5. A loading and unloading device comprising an article carrier provided with supporting rollers, runways for said rollers, rotatable elements at opposite ends of said runways, and means for moving said article carrier lengthwise of said runways including a drum intermediate said runways, a bracket connected to said article carrier, an adjusting bar pivotally connected to said article carrier, and a single flexible cable trained around said rotatable elements and drum and terminally connected to said bracket and adjusting bar respectively.

6. A loading and unloading device comprising an article carrier provided with supporting rollers, runways for said rollers, rotatable elements at opposite ends of said runways, and means for moving said article carrier lengthwise of said runways including a drum intermediate said runways, a bracket connected to said article carrier at one end thereof, an adjusting bar connected to said carrier at the other end thereof, and a single flexible cable trained around said rotatable elements and drum and terminally connected to said bracket and adjusting bar.

7. In a device of the class described, an article carrier provided with supporting rollers, a substantially rectangular supporting frame, opposite sides of said frame forming runways for said rollers, and means for actuating said article carrier including five rotatable elements, two at each end of the frame, and one at one end of the frame between the two at that end, and a single flexible cable trained around said rotatable elements, one end of said cable being connected to said article carrier at one end thereof, and the other end of said cable being connected to said article carrier at its other end.

8. In a device of the class described, an article carrier provided with supporting rollers, runways for said rollers, rotatable elements at opposite ends of said runways, means for moving said article carrier longitudinally of said runways including a drum intermediate said runways, and a single flexible cable trained around said rotatable elements and drum and connected to said article carrier at diagonally opposite corners thereof, and anti-friction side thrust devices connected to said article carrier at diagonally opposite corners thereof opposite the corners just mentioned and engaging said runways to facilitate movement of the article carrier when actuated by the means aforesaid.

9. In a device of the class described, an article carrier provided with supporting rollers, runways for said rollers, rotatable elements at opposite ends of said runways, means for moving said article carrier longitudinally of said runways including a drum intermediate said runways, a bracket connected to said article carrier, an adjusting bar connected to said article carrier, and a single flexible cable trained around said rotatable elements and drum and terminally connected to said bracket and adjusting bar respectively.

10. In a device of the class described, an article carrier provided with supporting rollers, a substantially rectangular supporting frame, opposite sides of said frame forming runways for said rollers, sheaves carried by said frame at the corners thereof, and means for moving said article carrier lengthwise of said runways including a drum carried by the frame at the rear end thereof, a single flexible cable trained around said sheaves and drum and connected to said article carrier at diagonally opposite corners thereof, and means at corners opposite the corners just mentioned of said article carrier engageable with said runways for maintaining said article carrier on a true course while being moved by the means aforesaid.

11. In a device of the class described, a tray provided with supporting rollers, runways for said rollers, means for moving said tray along said runways including a cable terminally connected to said tray at diagonally opposite corners thereof, and anti-friction side thrust devices connected to said tray at diagonal corners thereof opposite the diagonal corners just mentioned and engaging said runways for maintaining said tray on a true course while being moved by the cable aforesaid.

CHRISTIAN GIRL.